(12) United States Patent
Usami

(10) Patent No.: US 6,490,240 B1
(45) Date of Patent: Dec. 3, 2002

(54) OPTICAL RECORDING MEDIUM WITH INCREASED ADDRESSING ACCURACY

(75) Inventor: Yoshihisa Usami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/693,961

(22) Filed: Oct. 23, 2000

(30) Foreign Application Priority Data

Oct. 21, 1999 (JP) .......................................... 11-299359

(51) Int. Cl.$^7$ ................................................ G11B 7/24
(52) U.S. Cl. .................................. 369/275.4; 369/275.3
(58) Field of Search .......................... 369/275.4, 275.3, 369/275.1, 44.26, 44.13, 53.2, 53.11, 275.2, 280, 112.23

(56) References Cited

U.S. PATENT DOCUMENTS

| | | | |
|---|---|---|---|
| 5,604,726 A | | 2/1997 | Karube |
| 6,031,816 A | * | 2/2000 | Inui et al. ................. 369/275.4 |
| 6,049,521 A | * | 4/2000 | Aratani ........................ 369/280 |
| 6,246,656 B1 | * | 6/2001 | Kawakubo et al. ......... 369/112 |
| 6,295,271 B1 | * | 9/2001 | Inui et al. ................. 369/275.4 |

FOREIGN PATENT DOCUMENTS

| | | |
|---|---|---|
| EP | 0 818 778 A2 | 1/1998 |
| EP | 1 031 975 A2 | 8/2000 |
| JP | 9-326138 | 12/1997 |
| JP | 10-154332 | 6/1998 |
| JP | 11-126372 | 5/1999 |

OTHER PUBLICATIONS

Patent Abstracts of Japan, vol. 016, No. 527 (P–1447), Oct. 29, 1992, (JP 04–195939A, Jul. 15, 1992, Abstract.
Patent Abstracts of Japan, vol. 1997, No. 08, Aug. 29, 1007, (JP 09–102143A, Apr. 15, 1997), Abstract.
Patent Abstracts of Japan, vol. 1998, No. 02, Jan. 30, 1998, (JP 09–259439A, Oct. 3, 1997), Abstract.

* cited by examiner

Primary Examiner—Ali Neyzari
(74) Attorney, Agent, or Firm—Sughrue Mion, PLLC

(57) ABSTRACT

An optical recording medium has a substrate 12 which has a spiral or concentric circular grooves 32 and lands 34 disposed between the grooves 32. A pit is formed in advance in the land 34 and opens toward only one groove 32 of the grooves 32 adjacent the land 34. Address information of the one groove 32 toward which the pit is open is recorded by the pit.

21 Claims, 7 Drawing Sheets

OPTICAL RECORDING MEDIUM WITH INCREASED ADDRESSING ACCURACY

BACKGROUND OF THE INVENTION

1. Field of the Invention

The present invention relates to an optical recording medium, and in particular, to an optical recording medium having a land-and-groove structure, wherein pits, by which address information of the grooves is recorded, are formed in advance in the lands.

2. Description of the Related Art

In recent years, along with the development of short wavelength lasers, digital video discs (DVDs) have come to be used. Information can be recorded on DVDs at a higher density than on compact discs (CDs), and the recorded information can be played back. Currently, DVD-Rs, which are writable optical recording media on which a user can write information, are also in use.

A writable optical recording medium is usually provided with a substrate, a recording layer, a reflecting layer, and a protective layer. Grooves for tracking during recording are provided in the substrate in advance. The regions adjacent the grooves are called lands. Pits called land pre-pits (LPPs) are formed in advance in the lands of a DVD-R. The address information of the groove at the inner peripheral side of the land is thereby recorded at the land.

When the information recorded on a DVD-R is played back by tracking the grooves having pits therein by a push-pull method, the return light from the beam spot collected on the groove is converted into electric signals by four diodes A, B, C, D, so as to obtain signals A, B, C, D corresponding to the respective diodes. The value (A+B+C+D) which is the sum of the signals A, B, C, D is the playback signal for the recorded information. The value (A+B−C−D), which is the signals A, B corresponding to the return light at the outer peripheral side minus the signals C, D corresponding to the return light at the inner peripheral side, is the tracking error signal. Accordingly, as illustrated in FIG. 7, a negative pulse, which corresponds to the LPP of the land at the outer peripheral side of the groove, and a positive pulse, which corresponds to the LPP of the land at the inner peripheral side of the groove, are present in the tracking error signal. Because the address information of the groove at the inner peripheral side of a land is recorded in that land, by detecting the LPP signal expressed as the negative pulse, the address information recorded by the LPP can be read out.

In order to accurately read the address information, the negative pulse must be strong, and the surface area of the portion of the LPP at the inner peripheral side thereof must be made large to a certain extent. Further, the LPP is usually substantially oval, and is formed such that the center of the oval is positioned substantially on the center line of the land disposed between the grooves. Thus, as shown in FIG. 8, the LPP is usually open to (continuous with) both of the grooves adjacent to the LPP.

However, because the positive pulse is not used in reading the address information, there is no need for the positive pulse to be strong. Conversely, the positive pulse being too strong results in noise with respect to the Rf signal. Further, when the LPP opens onto the grooves, at the time the pit is formed in the recording layer on the region adjacent to the LPP, the material of the recording layer swells and spreads as far as the LPP such that the desired pit length cannot be obtained, and information cannot be recorded correctly.

SUMMARY OF THE INVENTION

Accordingly, an object of the present invention is to provide an optical recording medium in which address information can be read correctly, while good recording/playback characteristics of the optical recording medium are still maintained.

In order to achieve this object, the present invention provides an optical recording medium having a substrate which has a spiral or concentric circular grooves and has lands between the grooves, wherein a pit is formed in advance in the land, the pit being open only toward one groove of the grooves adjacent to the land in which the pit is formed, address information of the one groove toward which the pit is open being recorded by the pit.

In the present invention, the pits (LPPs) formed in the land are open toward only one groove of the grooves adjacent the land. The pits are not open toward the other groove. Thus, when pits are formed in the recording layer on the other groove, the land in which the LPPs are formed can prevent the recording layer material from spreading to the LPPs. As a result, the LPP can be prevented from adversely affecting the length of the pit formed in the recording layer of the other groove.

If the surface area of the LPP at the open side thereof is made sufficiently large, the pulse of the LPP signal, which pulse is necessary for reading the address information, is sufficiently strong. Further, when a beam spot is illuminated onto the groove at the side at which the LPP is not open, the pulse disused for reading the address information does not exist (or is small). As a result, the address information can be read accurately, and noise with respect to the RF signal can be reduced.

DESCRIPTION OF THE PREFERRED EMBODIMENTS

An embodiment of the present invention will be described in detail hereinafter with reference to the accompanying drawings. In the present embodiment, the present invention is applied to a DVD-R type optical recording medium having a recording layer only at one surface side.

Figure 2:
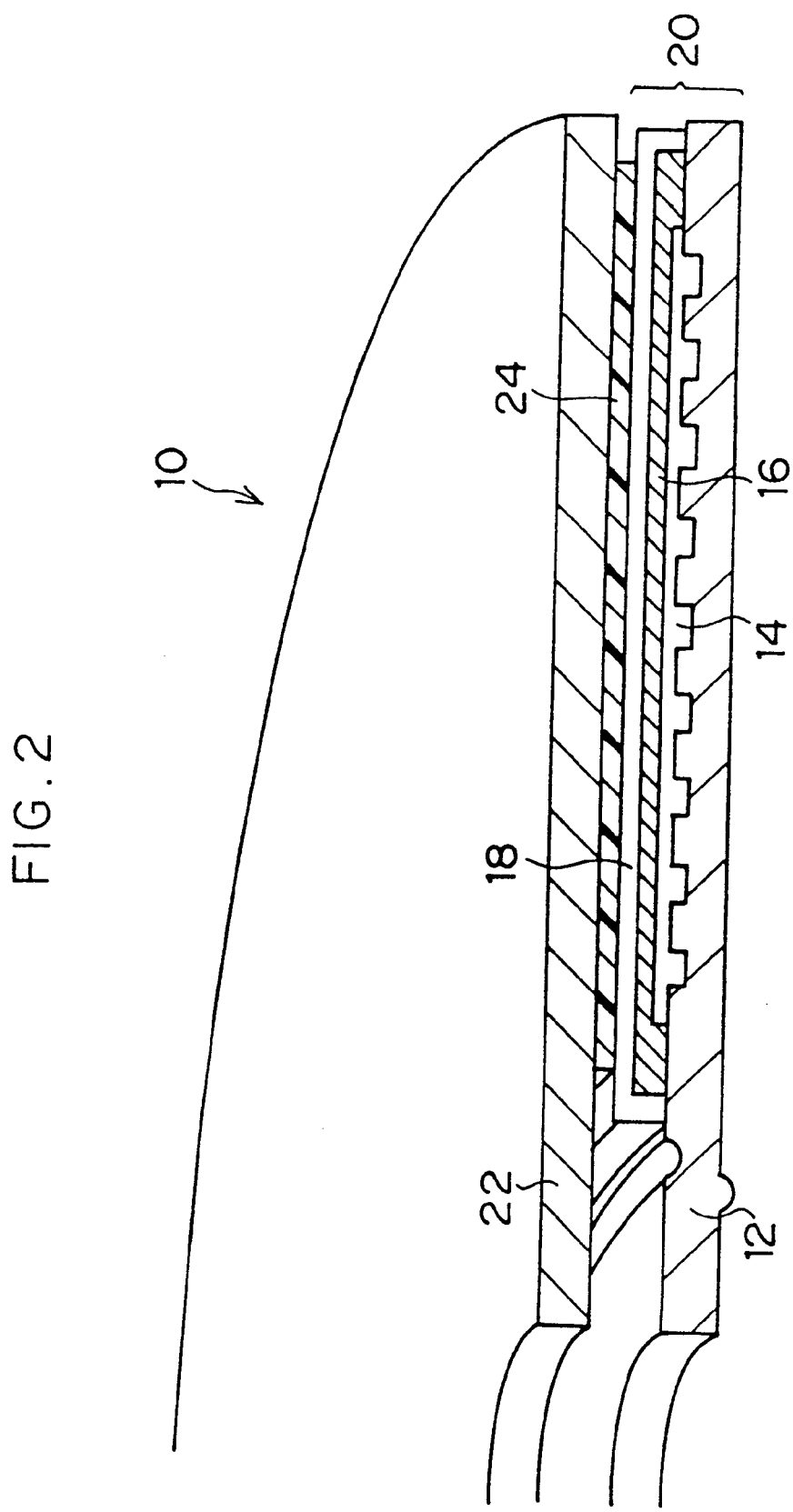
FIG. 2 is a perspective view illustrating the layered structure of the optical recording medium of the embodiment.

As illustrated in FIG. 2, in a DVD-R type optical recording medium 10, a layered body 20 and a protective substrate 22 which have the same size are joined together by an adhesive 24. The layered body 20 is formed by a dye containing recording layer 14, a reflecting layer 16 and a protective layer 18 being formed in that order on the surface of a transparent, disc-shaped substrate 12 at which surface grooves are formed at a track pitch of 0.6 to 0.9 μm. The DVD-R type optical recording medium 10 is manufactured as follows.

Grooves for tracking are formed on the substrate 12. The regions adjacent to the grooves are called lands. It is preferable that the grooves are formed at a predetermined track pitch directly on the substrate at the time a resin material, such as polycarbonate, is injection molded or extrusion molded. The depth of the groove is preferably in the range of 80 to 300 nm, and more preferably in the range of 100 to 250 nm. Further, the half-width of the groove is preferably in the range of 0.2 to 0.9 μm.

Figure 1:
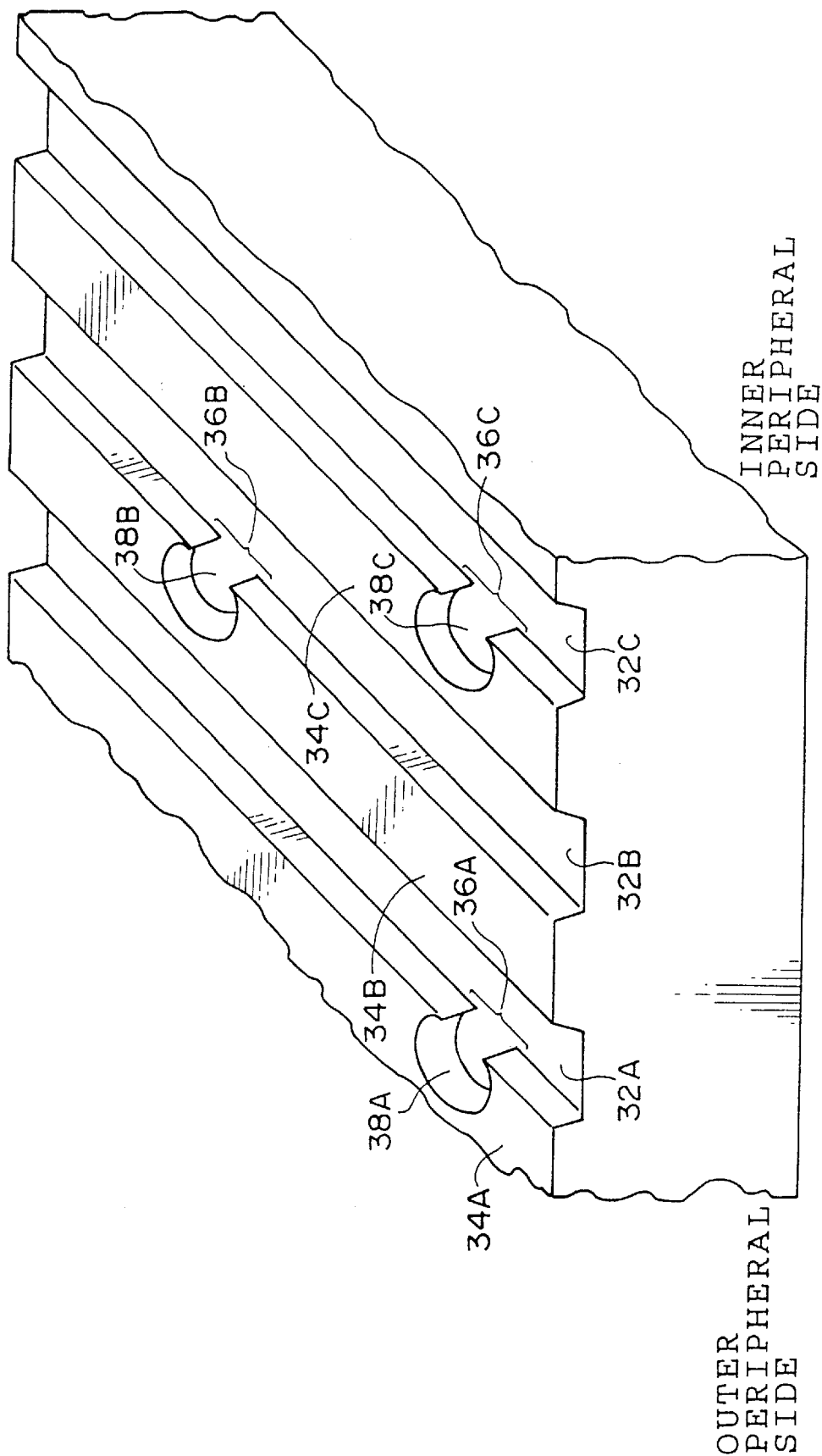
FIG. 1 is a perspective view of a substrate which is used in an optical recording medium of an embodiment of the present invention and at which LPPs are formed.

As shown in FIG. 1, the lands and grooves are disposed alternately, such that a land 34A is disposed at the outer peripheral side of a groove 32A, a land 34B is disposed at the outer peripheral side of a groove 32B, and a land 34C is disposed at the outer peripheral side of a groove 32C. A land pre-pit (LPP) 38B, by which address information of the groove 32B is recorded, is formed in the land 34B between the adjacent grooves 32A, 32B. Similarly, an LPP 38A, by which address information of the groove 32A is recorded, is formed in the land 34A, and an LPP 38C, by which address information of the groove 32C is recorded, is formed in the land 34C. As illustrated in FIG. 1, in order to obtain LPP signals of sufficient strength, the LPPs are not formed at positions of the land which positions are opposite to LPPs in adjacent lands. For example, an LPP is not formed at a position of land 34C which position is opposite to LPP 38B. The address information of each groove is recorded by forming the LPP in the land at the outer peripheral side of the groove. In the present invention, the configurations of the LPPs and the positions at which the LPPs are formed are important.

The LPP 38B provided at the land 34B is open only toward the groove corresponding to the address information recorded by the LPP 38B (i.e., is open only toward the groove 32B which is at the inner peripheral side thereof in FIG. 1), and is not open at the other groove side (is not open toward the groove 32A at the outer peripheral side thereof). The same holds for the LPP 38A and the LPP 38C. Thus, an LPP (e.g., 38C) is open only toward the groove (e.g., 32C) corresponding to the address information recorded by that LPP. In this way, when pits are formed in the recording layer on the groove (e.g., the groove 32B) at the side at which the LPP is not open to, the land (e.g., 34C) in which that LPP is formed prevents the recording layer material from spreading to the LPP. As a result, the LPP can be prevented from adversely affecting the length of the pit formed in the recording layer on the groove toward which the LPP is not open.

Figure 3:
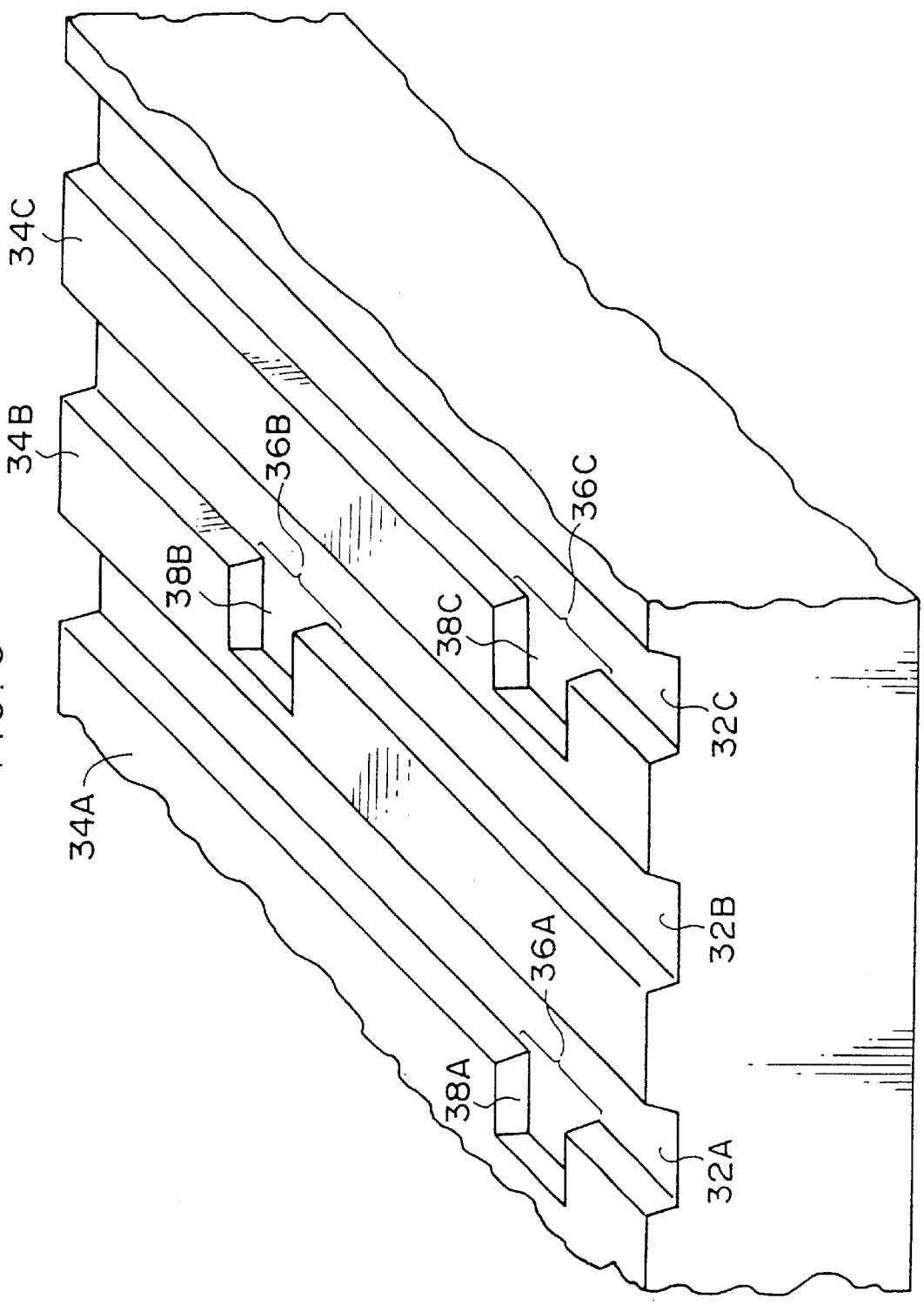
FIG. 3 is a perspective view illustrating another substrate which is used in the optical recording medium of the embodiment, and in which LPPs having rectangular configurations as seen in plan view are formed.

The configuration of the LPP in plan view (i.e., the configuration of the LPP as viewed from above) may be, as illustrated in FIG. 1, a portion of an oval (which is the usual shape of a pit), or as illustrated in FIG. 3, may be rectangular. It is preferable that the lengths of openings 36A, 36B of the LPPs are short so as to reduce the adverse affect that the LPP has on the length of the pit formed in the groove toward which the LPP is open. Thus, it is preferable that the LPP is shaped, in plan view, as a portion of an oval.

Figure 4A:
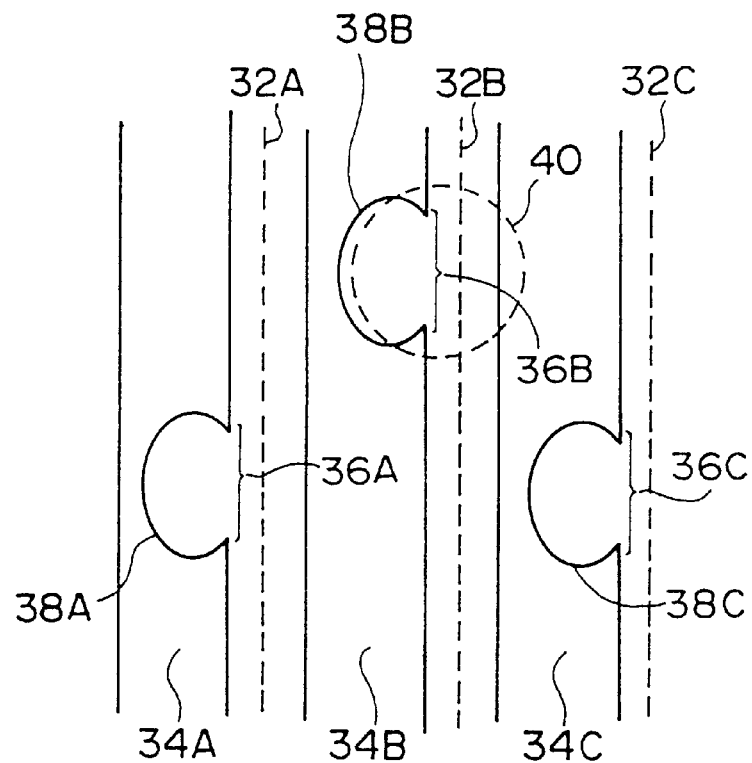
FIG. 4A is a plan view of a portion of the substrate of FIG. 1.

FIG. 4A is a view as seen from above the substrate 12. LPPs, each of which is shaped as a portion of an oval in plan view, are formed in the substrate 12 such that the longitudinal directions of the LPPs are substantially parallel to the center lines of the lands. Further, as can be understood from FIG. 4A, the LPP 38B is formed in the land 34D at the side of groove 32B. In order to enable reliable detection of the LPP signal, the LPP is the same size as or smaller than the size of a spot 40 of the playback beam. It is preferable that the playback beam spot 40 be illuminated onto the substrate 12 and be moved along the center line of the groove 32B (which center line is represented by the dashed line) such that the surface area over which the playback beam spot 40 and the groove overlap is large enough to allow a sufficient strong playback signal to be obtained, and such that the surface area over which the playback beam spot 40 and the land at the outer peripheral side of the groove overlap, at which land are formed the LPPs by which the address information of that groove is recorded, is larger than the surface area over which the playback beam spot 40 and the land at the inner peripheral side of the groove overlap. When the LPP is formed so as to be closer to the groove corresponding to the address information recorded by that LPP, the surface area over which the spot 40 and the LPP 38B, which is formed at the land 34B at the outer peripheral side of the groove 32B, overlap one another is large, and the surface area over which the spot 40 and the LPP 38C, which is formed at the land 34C at the inner peripheral side of the groove 32B, overlap one another is small. Therefore, in the LPP signal, the pulse which is needed to read the address information is large, and the pulse which is not needed to read the address information is small. As a result, the address information can be read correctly, and noise with respect to the RF signal can be reduced.

Figure 4B:
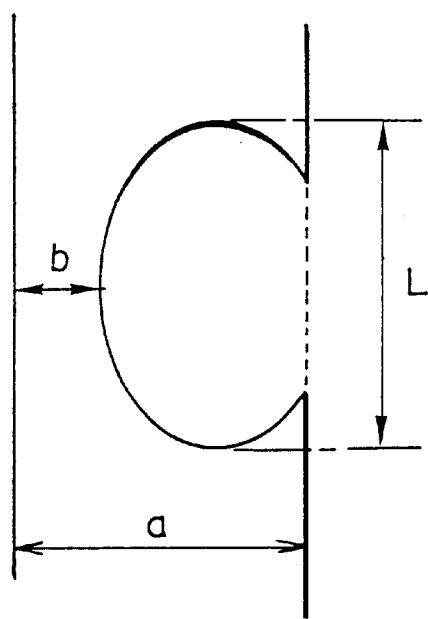
FIG. 4B is an enlarged view of a portion of FIG. 4A.

As illustrated in FIG. 4B, given that the width of the region of the land at which the LPP is not formed (the regular land width) is a and that the width of the narrowest portion of the land at the region at which the LPP is formed (the narrowest land width) is b, the ratio (b/a) of the narrowest land width b to the regular land width a is preferably 1/40 or more, more preferably 1/8 or more, and particularly preferably 1/5 or more, in order for the pulse, in the LPP signal, which pulse is needed for reading address information to be large and for the pulse which is not needed to read the address information to be small. For example, for a land whose regular land width is 0.4 μm, the narrowest land width is preferably 0.01 μm or more, more preferably 0.05 μm or more, and particularly preferably 0.08 μm or more.

Further, as illustrated in FIG. 4B, given that the length of the LPP in the scanning direction of the spot 40 is L, the upper limit of the LPP length L is preferably 2.0 times or less than 2.0 times the diameter of the beam spot, and is more preferably 1.5 times or less than 1.5 times. The lower limit of the LPP length L is preferably 0.2 times or more than 0.2 times the diameter of the beam spot, more preferably 0.5 times or more than 0.5 times, and particularly preferably 0.8 times or more than 0.8 times. For example, if the diameter of the beam spot is 0.4 to 0.8 μm, the length of the LPP is preferably 0.4 to 0.6 μm.

Examples of the material used for the substrate 12 (including the protective substrate 22) are glass; polycarbonate; acrylic resins such as polymethyl methacrylate and the like; vinyl chloride resins such as polyvinyl chloride, vinyl chloride copolymers, and the like; epoxy resins; amorphous polyolefin; polyester; and the like. A combination of these materials may be used if desired. Among the above-listed materials, polycarbonate is preferable from the standpoints of moisture resistance, dimensional stability and cost.

The substrate may be thin like a film, or may be thick so that the optical recording medium is rigid. Usually a substrate having a diameter of 120±3 mm and a thickness of 0.6±0.1 mm is used, or a substrate having a diameter of 80±3 mm and a thickness of 0.6±0.1 mm is used.

An undercoat layer may be provided on the surface of the substrate 12 at which surface the recording layer 14 is to be provided, in order to improve the flatness, improve the adhesion, prevent changing of the properties of the recording layer 14, and the like. Examples of materials used for the undercoat layer are polymer substances such as polymethyl methacrylate, acrylic acid-methacrylic acid copolymer, styrene-maleic anhydride copolymer, polyvinyl alcohol, N-methylolacrylamide, styrene-vinyltoluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, polycarbonate, and the like; and surface improving agents such as silane coupling agents and the like.

The undercoat layer may be formed by dissolving or dispersing any of the aforementioned substances in an appropriate solvent so as to prepare a coating solution, and thereafter, applying the coating solution to the surface of the substrate by using a coating method such as spin coating, dip coating, extrusion coating or the like. The thickness of the undercoat layer is generally 0.005 to 20 $\mu$m, and preferably 0.01 to 10 $\mu$m.

The dye containing recording layer 14 is provided on the surface of the substrate 12 at which the grooves are formed (or the undercoat layer). Examples of the dye are cyanine dyes, azo dyes, phthalocyanine dyes, oxanol dyes, and pyrromethene dyes. Cyanine dyes, azo dyes and oxanol dyes are preferable, and cyanine dyes and oxanol dyes are particularly preferable.

The dye containing recording layer 14 may be formed as follows. A coating solution is prepared by dissolving, for example, a cyanine dye, and if desired, an antifade agent, a binder or the like, in a solvent. Then, the coating solution is applied onto the surface of the substrate at which the grooves are formed, so as to form a coated film which is then dried.

Examples of the solvent for the coating solution for forming the dye containing recording layer are esters such as butyl acetate, cellusolve acetate, and the like; ketones such as methyl ethyl ketone, cyclohexanone, methyl isobutyl ketone, and the like; chlorinated hydrocarbons such as dichloromethane, 1,2-dichloroethane, chloroform, and the like; amides such as dimethylformamide and the like; hydrocarbons such as cyclohexane and the like; ethers such as tetrahydrofuran, ethyl ether, dioxane and the like; alcohols such as ethanol, n-propanol, isopropanol, n-butanol, diacetone alcohol, and the like; fluorine-containing solvents such as 2,2,3,3-tetrafluoropropanol and the like; glycol ethers such as ethyleneglycol monomethyl ether, ethyleneglycol monoethyl ether, propyleneglycol monomethyl ether, and the like. One of these solvents may be used or two or more may be used in combination, in consideration of the solubility of the compound which is used. Any of various additives such as antioxidants, UV light absorbers, plasticizers, lubricants or the like may be included in the coating solution in accordance with the object.

Typical examples of the antifade agent are nitroso compounds, metal complexes, diammonium salts, aminium salts and the like. Examples thereof are disclosed in Japanese Patent Application Laid-Open (JP-A) Nos. 2-300288, 3-224793, 4-146189 and the like. When an antifade agent is used, the amount thereof used, with respect to the amount of the dye, is generally 0.1 to 50 wt %, preferably 0.5 to 45 wt %, more preferably 3 to 40 wt %, and particularly preferably 5 to 25 wt %.

Examples of the binder include natural organic polymer substances such as gelatin, cellulose derivatives, dextran, rosin, rubber, and the like; as well as synthetic organic polymers such as polyurethane; hydrocarbon resins such as polyethylene, polypropylene, polystyrene, polyisobutylene, and the like; vinyl resins such as polyvinyl chloride, polyvinylidene chloride, polyvinyl chloride-polyvinyl acetate copolymer, and the like; acrylic resins such as polymethyl acrylate, polymethyl methacrylate, and the like; polyvinyl alcohol; chlorinated polyethylene; epoxy resin; butyral resin; rubber derivatives, and initial condensation products of thermosetting resins such as phenol-formaldehyde resins, and the like. When a binder is included in the material for the recording layer 14, the amount of the binder used is, with respect to 100 parts by weight of the dye, 0.2 to 20 parts by weight, preferably 0.5 to 10 parts by weight, and more preferably 1 to 5 parts by weight. The concentration of the dye in the coating solution prepared in this way is generally 0.01 to 10 wt %, and preferably 0.1 to 5 wt %.

Examples of the coating method are spraying, spin coating, dipping, roll coating, blade coating, doctor roll coating, screen printing, and the like. The dye containing recording layer 14 may be formed by a single layer or plural layers. The layer thickness of the dye containing recording layer 14 is generally 20 to 500 nm, and preferably 50 to 300 nm. In the optical disc of the present invention, the thickness of the dye containing recording layer 14 is, within the grooves, preferably 130 to 200 nm, more preferably 140 to 190 nm, and particularly preferably 145 to 185 nm. Further, the thickness of the dye containing recording layer 14 on the lands is preferably 50 to 150 nm, and more preferably 60 to 120 nm.

The reflecting layer 16 is provided on the recording layer 14 in order to improve the reflectance during playback of information. The light reflecting substance which is the material of the reflecting layer 16 is a substance having high reflectance with respect to laser light, and examples thereof include metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi, as well as metalloids and stainless steel. Preferable among these are Cr, Ni, Pt, Cu, Ag, Au, Al and stainless steel. A single one of these substances may be used, or two or more may be used in combination. Further, an alloy may be used. The reflecting layer 16 is formed on the recording layer 14 by, for example, depositing, sputtering, or ion plating the reflective substance. The layer thickness of the reflecting layer 16 is generally 10 to 800 nm, preferably 20 to 500 nm, and more preferably 50 to 300 nm.

The protective layer 18 is provided on the reflecting layer 16 in order to physically and chemically protect the recording layer 14 and the like. The protective layer 18 may also be provided on the substrate 12 at the side at which the recording layer 14 is not provided, in order to improve scratch resistance and moisture resistance. Examples of the material used for the protective layer 18 are inorganic substances such as SiO, $SiO_2$, $MgF_2$, $SnO_2$, $Si_3N_4$ and the like, and organic substances such as thermoplastic resins, thermosetting resins, UV-curing resins, and the like. Note that it is not absolutely necessary to provide a protective layer 18.

The protective layer 18 may be formed by, for example, laminating on the reflecting layer 16 and/or the substrate 12 a film obtained by extruding a plastic. Or, the protective layer 18 may be formed by vacuum deposition, sputtering, coating or the like. When the protective layer 18 is formed by a thermoplastic resin or a thermosetting resin, the protective layer 18 may be formed by the resin being dissolved in an appropriate solvent so as to form a coating solution, and thereafter, the coating solution being coated and dried. When the protective layer 18 is formed by a UV-curing resin, the protective layer 18 may be formed by applying the UV-curing resin or a coating solution in which the UV-curing resin is dissolved in an appropriate solution, and thereafter curing it by irradiating UV light. Various additives such as antistatic agents, antioxidants, UV light absorbers or the like may be added to the coating solution in accordance with the object. The thickness of the protective layer 18 is generally in the range of 0.1 to 100 μm.

The layered body 20 having the recording layer 14, the reflecting layer 16 and the protective layer 18 on the substrate 12 can be formed by the above-described processes. The obtained layered body 20 and the protective substrate 22, which is disc-shaped and has substantially the same dimensions as that of the substrate 12 of the layered body 20, are laminated together by the adhesive 24 with the recording layer 14 disposed at the inner side, so as to manufacture the DVD-R optical recording medium 10 having a recording layer on only one side thereof. The adhesive may be the UV-curing resin which is used to form the protective layer 18, or may be a synthetic adhesive. Or, double-sided tape may be used. The thickness of the optical recording medium after lamination is preferably 1.2±0.2 mm.

Recording and playback of the obtained DVD-R optical recording medium are, for example, carried out as follows.

First, while the optical recording medium is being rotated at a predetermined constant linear speed (3.84 m/second) or at a predetermined constant angular speed, laser light for recording, such as semiconductor laser light, is collected through an optical system, and is illuminated onto the optical recording medium from the substrate 12 side thereof. The illuminated portion of the recording layer 14 absorbs the laser light, and the temperature of this portion rises such that the dye within the recording layer physically or chemically changes. Due to the optical characteristics of the illuminated portions changing, information is recorded. The recording light is laser light in the visible range. Usually, a semiconductor laser beam having a wavelength in a range of 600 to 700 nm (preferably 620 to 680 nm, and more preferably 630 to 660 nm) is used. The recording light is preferably collected through an optical system having an NA of 0.55 to 0.7.

The information recorded in this way can be played back by semiconductor laser light, which has the same wavelength as the wavelength of the recording light, being illuminated from the substrate side while the optical recording medium is rotated at a predetermined constant linear velocity, and the reflected light being detected.

The present embodiment is an example in which the DVD-R optical recording medium has a recording layer only at one side thereof, and is structured such that a laminated body, provided with a dye containing recording layer, a reflecting layer and a protective layer on a substrate surface, and a disc-shaped protective substrate, which has substantially the same dimensions as the substrate, are joined together with the recording layer at the inner side. However, the present invention is also applicable to a DVD-R optical recording medium having a recording layer at both sides thereof, and structured such that two laminated bodies, each having a dye containing recording layer, a reflecting layer and a protective layer on a substrate surface, are joined together such that the respective recording layers are disposed at the inner side.

Further, in the present embodiment, the DVD-R optical recording medium is described as an example. However, the present invention may be applied to an optical recording medium at which address information can be recorded by LPPs, for example, to DVD-RWs which are rewritable digital video discs, as well as to CD-Rs, MOs, and the like.

EXAMPLES

Example 1

A substrate (thickness: 0.6 mm; outer diameter: 120 mm; inner diameter: 15 mm) in whose surface spiral grooves were formed, was manufactured by injection molding a polycarbonate (manufactured by Teijin KK; tradename: PANLIGHT AD5503).

Figure 5:
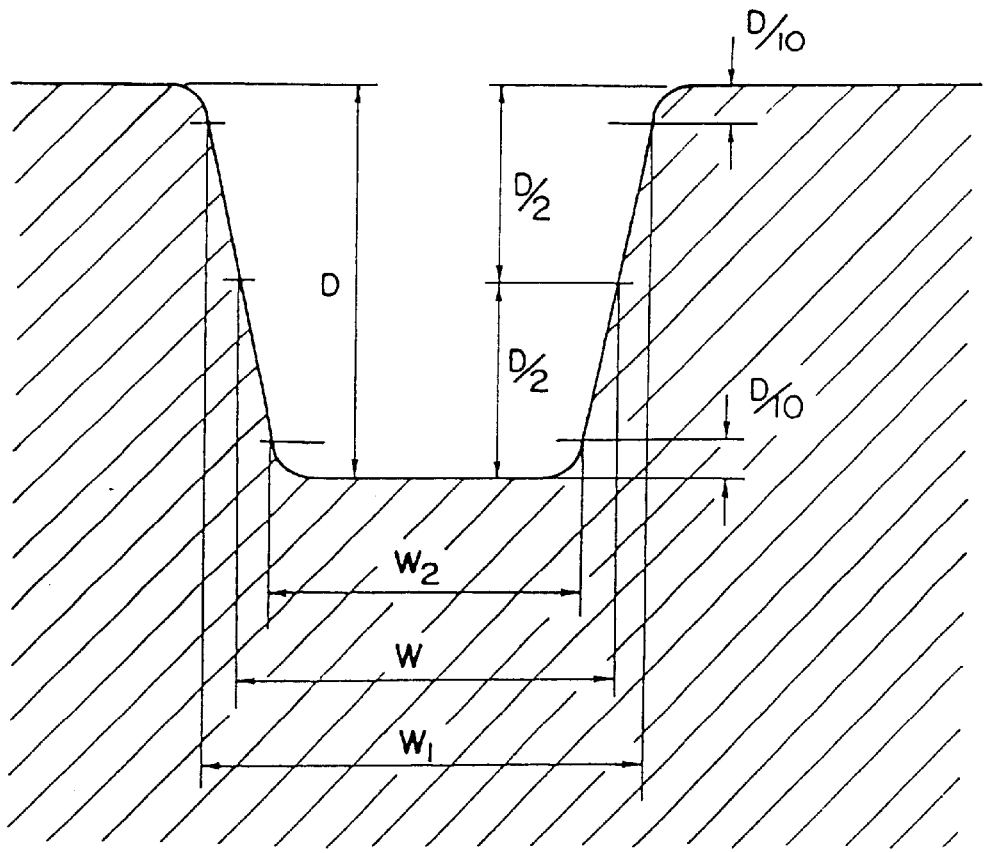
FIG. 5 is a cross-sectional view of a groove.

The depth, width and pitch of the grooves, and widths of the inclined portions of the grooves were as follows. The depth D of the grooves, the groove width W, and the width $(W_1-W_2)/2$ of the inclined portion of the grooves are defined as illustrated in FIG. 5. The groove depth, groove width, groove pitch and width of the inclined portion of the grooves were measured by using an atomic force microscope (AFM).

groove depth D: 150 nm groove width W: 300 nm groove pitch: 740 nm width $(W_1-W_2)/2$ of groove inclined portion: 120 nm (60 nm at one side)

The average value of the land width (regular land width a) was 0.44 μm, and LPPs which were open only toward the grooves at the inner peripheral sides thereof were formed in the lands. The configuration of the LPP in plan view was an oval of which a portion was missing, as illustrated in FIG. 4B. The narrowest land width b was 0.1 μm, and the LPP length L was 0.5 μm. The ratio (a/b) of the average value of the land width to the narrowest land width was 22/5.

The following oxanol dye was dissolved in an amount of 1 g in 100 ml of 2,2,3,3-tetrafluoro-1-propanol. The obtained coating solution for forming the light absorbing layer was applied onto the surface of the substrate, at which surface the grooves were formed, by spin coating while the rotational speed was varied from 300 to 3000 rpm. The coated film was dried so that the light absorbing layer was formed. The thickness of the light absorbing layer was measured by SEM at a cross-section of the light absorbing layer, and was found to be 110 nm within the grooves and 70 nm at the land portions.

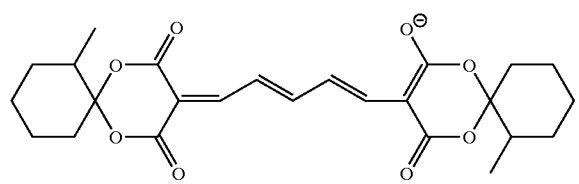

-continued

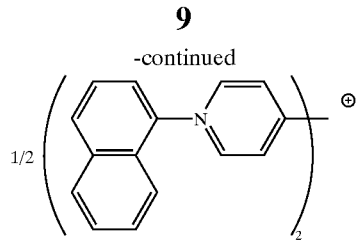

Next, a reflecting layer was formed from Au to a thickness of about 100 nm on the light absorbing layer in an argon atmosphere by DC sputtering. The pressure within chamber was 0.8 Pa.

A UV-curing resin (trade name: SD-318, manufactured by Dainippon Ink and Chemicals, Co., Ltd.) was applied onto the reflecting layer by spin coating while the rotational speed was varied from 300 rpm to 4000 rpm. After coating, ultraviolet rays were illuminated from above the coated film by a high-pressure mercury lamp, such that the coated film was cured and a protective layer having a layer thickness of 8 μm was formed. The hardness of the surface of the protective layer was determined as follows: the protective layer was written on by using pencils having leads of varying hardnesses, and the softest lead which formed a scratch in the protective layer was a lead having a hardness of 2 H. In this way, a laminated body was obtained in which the light absorbing layer, the reflecting layer and the protective layer were provided in that order on the substrate.

As the protective substrate, a disc-shaped protective substrate (diameter: 120 mm; thickness: 0.6 mm) made of polycarbonate was readied. The laminated body obtained above and this protective substrate were laminated together such that the substrate of the laminated body was at the outer side, by using a UV-curing acrylate adhesive XNR552 manufactured by CIBA Co. The thickness of the layer of the adhesive was 40 μm.

The DVD-R optical disc in accordance with the present invention was thus prepared by the above processes.

Comparative Example 1

Figure 6:
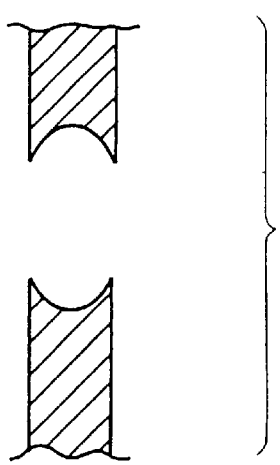
FIG. 6 is a plan view illustrating an LPP formed in a substrate of an optical recording medium of a comparative example.
Figure 7:
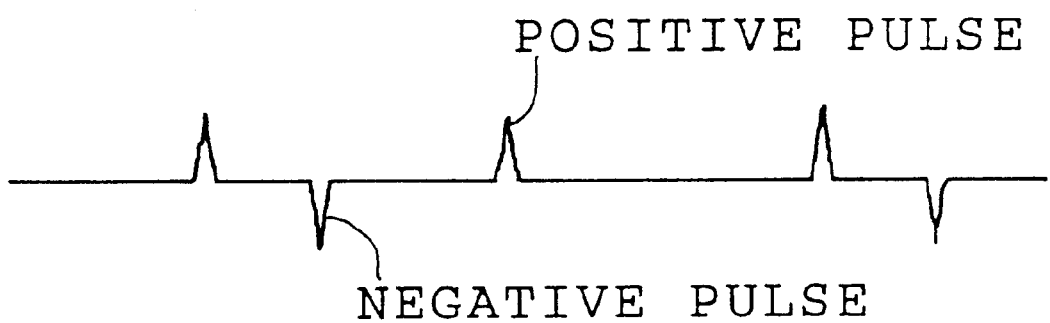
FIG. 7 is a diagram showing a waveform of an LPP signal.
Figure 8:
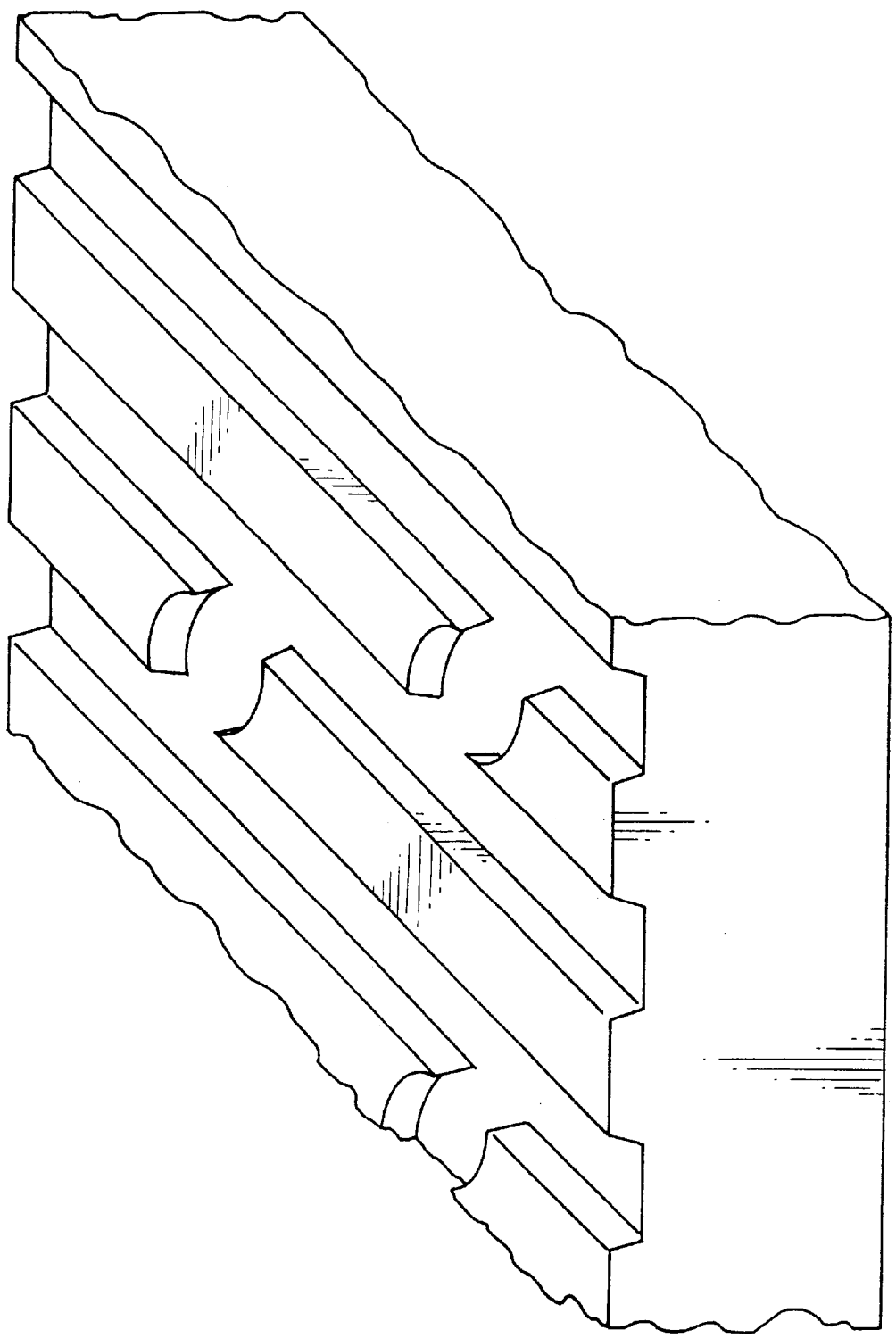
FIG. 8 is a perspective view of a substrate, at which LPPs are provided, of a conventional optical recording medium.

A DVD-R optical disc for comparison was obtained which was the same as that of Example 1, except that the LPPs opened to both adjacent grooves. The configuration in plan view of the LPP was an elongated circle from which portions were missing at both sides thereof, as illustrated in FIG. 6. The length of the LPP was 0.5 μm. Measurement of LPP Signal Strength Before Recording The strength of the LPP signal before recording was measured from the amplitude of the pulse (negative pulse) in the tracking error signal obtained from the DVD-R optical disc of the Example and the DVD-R optical disc of the Comparative Example by the push-pull method. There was hardly any positive pulse in the tracking error signal of the DVD-R of the Example.

Evaluation of Optical Discs

A signal having a modulation frequency of 0.935 MHz was recorded on the above Example and Comparative Example DVD-R optical discs at a recording power of 9 mW, a constant linear speed of 3.8 m/s, and a laser light wavelength of 635 nm (with pick-up at NA 0.6) by using a DDU1000 (manufactured by Pulstec Co.) evaluator.

The 3T pit jitter of the recorded optical discs were measured by using a modulation domain analyzer 53310A manufactured by Hewlett Packard Co. The smaller the value of the 3T pit jitter, the smaller the variation in pit lengths.

The obtained results are listed in following Table 1.

TABLE 1

|  | Jitter | Amplitude of LPP Signal |
| --- | --- | --- |
| Example | 7.9% | 0.03 |
| Comparative Example | 8.6% | 0.03 |

As can be seen from Table 1, with the DVD-R optical disc in accordance with the present invention (i.e., Example 1), the amplitude of the LPP signal was large (0.03), address information detection was satisfactory, and a stable recording/playback characteristic with a low 3T pit jitter value could be obtained. On the other hand, with the DVD-R optical disc for comparison (i.e., Comparative Example 1), although the amplitude of the LPP signal was the same (0.03) as Example 1, a satisfactory recording/playback characteristic could not be obtained as evidenced by the facts that the 3T pit jitter value was large, errors in reading the digital signal occurred easily, and the like.

What is claimed is:

1. An optical recording medium comprising:
   a substrate with a spiral groove or a plurality of concentric circular grooves;
   a plurality of lands each formed between sections of the spiral groove or between two of the concentric circular grooves, wherein at least one pit is formed in the lands, each pit being open only toward one section of the spiral groove or toward one of the plurality of concentric grooves adjacent to the land in which the pit is formed and each pit being formed at a position on a respective land so no two pits formed on adjacent lands are in the same radial line; and address information recorded in each pit.

2. An optical recording medium according to claim 1, wherein the one section of the spiral groove or the one concentric groove is at an inner peripheral side of the land.

3. An optical recording medium according to claim 1, wherein a configuration of the pit in plan view is a portion of an oval.

4. An optical recording medium according to claim 3, wherein a center of the pit is disposed at a side, near the one section of the spiral groove or the one concentric groove, of a central line of the land.

5. An optical recording medium according to claim 4, wherein a center of the pit is disposed at a side, near the one section of the spiral groove or the one concentric groove, of a central line of the land.

6. An optical recording medium according to claim 4, wherein a center of the pit is disposed at a side, near the one grove, of a central line of the land.

7. An optical recording medium according to claim 1, wherein a configuration of the pit in plan view is rectangular.

8. An optical recording medium according to claim 2, wherein a configuration of the pit in plan view is rectangular.

9. An optical recording medium according to claim 1, wherein a ratio (b/a) of a width b of a narrowest portion of the land to a width a of a portion of the land other than a portion of the land at which the pit is formed is ⅟40 or greater.

10. An optical recording medium according to claim 2, wherein a ratio (b/a) of a width b of a narrowest portion of the land to a width a of a portion of the land other than a portion of the land at which the pit is formed is ⅟40 or greater.

11. An optical recording medium according to claim 3, wherein a ratio (b/a) of a width b of a narrowest portion of the land to a width a of a portion of the land other than a portion of the land at which the pit is formed is ⅟40 or greater.

12. An optical recording medium according to claim 5, wherein a ratio (b/a) of a width b of a narrowest portion of the land to a width a of a portion of the land other than a portion of the land at which the pit is formed is 1/40 or greater.

13. An optical recording medium according to claim 7, wherein a ratio (b/a) of a width b of a narrowest portion of the land to a width a of a portion of the land other than a portion of the land at which the pit is formed is 1/40 or greater.

14. An optical recording medium according to claim 1, wherein a width b of a narrowest portion of the land is 0.01 µm or more.

15. An optical recording medium according to claim 2, wherein a width b of a narrowest portion of the land is 0.01 µm or more.

16. An optical recording medium according to claim 3, wherein a width b of a narrowest portion of the land is 0.01 µm or more.

17. An optical recording medium according to claim 5, wherein a width b of a narrowest portion of the land is 0.01 µm or more.

18. An optical recording medium according to claim 7, wherein a width b of a narrowest portion of the land is 0.01 µm or more.

19. An optical recording medium according to claim 1, wherein a width b of a narrowest portion of the land is 0.08 µm or more.

20. An optical recording medium according to claim 2, wherein a width b of a narrowest portion of the land is 0.08 µm or more.

21. An optical recording medium comprising:

a substrate with a spiral groove or a plurality of concentric circular grooves;

a recording layer containing a dye;

a plurality of lands each formed between sections of the spiral groove or between two of the concentric circular grooves, wherein at least one pit is formed in the lands, each pit being open only toward one section of the spiral groove or toward one of the plurality of concentric grooves adjacent to the land in which the pit is formed and each pit being formed at a position on a respective land so no two pits formed on adjacent lands are in the same radial line and address information is recorded in each pit.

* * * * *